(12) United States Patent
Sato et al.

(10) Patent No.: US 7,954,923 B2
(45) Date of Patent: Jun. 7, 2011

(54) LIQUID EJECTING APPARATUS AND LIQUID EJECTING METHOD

(75) Inventors: Akito Sato, Matsumoto (JP); Bunji Ishimoto, Matsumoto (JP); Tomohiro Yuda, Minowa-machi (JP); Takeshi Tanoue, Matsumoto (JP); Naoki Sudo, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 295 days.

(21) Appl. No.: 12/383,940

(22) Filed: Mar. 30, 2009

(65) Prior Publication Data

US 2009/0251499 A1 Oct. 8, 2009

(30) Foreign Application Priority Data

Mar. 28, 2008 (JP) ................................. 2008-087787

(51) Int. Cl.
  *B41J 2/145* (2006.01)
(52) U.S. Cl. .................. 347/41; 347/15; 347/5
(58) Field of Classification Search .................. 347/5, 9, 347/12, 14, 15, 41
  See application file for complete search history.

(56) References Cited

U.S. PATENT DOCUMENTS 6,145,960 A * 11/2000 Kanda et al. .................... 347/41
6,698,861 B1 * 3/2004 Drake ............................. 347/15

FOREIGN PATENT DOCUMENTS

| JP | 05-138936 | 6/1993 |
| JP | 06-047925 | 2/1994 |
| JP | 08-025693 | 1/1996 |

* cited by examiner

*Primary Examiner* — Lam S Nguyen
(74) *Attorney, Agent, or Firm* — Nutter McClennen & Fish LLP; John J. Penny, Jr.; Christopher J. Stow

(57) ABSTRACT

A liquid ejecting apparatus includes: a printing head that ejects liquid to form dots on a recording medium; a head driving section that performs a main scanning for the printing head; a transporting section that performs a sub-scanning for the recording medium; an image forming section that forms an image, a first dot formation area and a second dot formation area; an overlap control section that performs overlap control for intermittently forming dots on the first and second dot formation areas so as to make the second dot formation area overlap with the first dot formation area and fill spaces between the dots intermittently formed on the first dot formation area; and a cancellation section that cancel the overlap control when a blank area exists in an image and a nozzle forming at least one of the first dot formation area and the second dot formation area.

7 Claims, 10 Drawing Sheets

LIQUID EJECTING APPARATUS AND LIQUID EJECTING METHOD

BACKGROUND

1. Technical Field

The present invention relates to a liquid ejecting apparatus that forms an image on a recording medium by ejecting liquid.

2. Related Art

An ink jet type printer (hereinafter, it is referred to as an ink jet printer) has been used as an example of liquid ejecting apparatuses, which forms an image by scanning a printing head having a plurality of nozzles for forming dots in a main scanning direction, ejecting liquid, and transporting a recording medium in a sub-scanning direction intersecting the main scanning direction. Such an inkjet printer, for example, repeatedly forms an area (hereinafter, it is referred to as a band) having a width depending on a length of arrangement of the plurality of nozzles of the printing head, repeatedly transports the recording medium in the sub-scanning direction in accordance with the band width during a single scanning of the printing head, and arranges bands in the sub-scanning direction so as to bring an end portion of one band into contact with an end portion of the other band formed by the next scanning, thereby forming an image. Such a printing method is called "band printing method".

However, in the band printing method, sometimes stripes appear at the boundaries between the bands. The stripes cause deterioration in image quality of the image formed on the recording medium. To suppress the deterioration in image quality caused by the stripes appearing at the boundaries between the bands, for example, a process as described in JP-A-H06-47925 has been performed. In the process, the lower end portion of a previous band formed by a first scanning of the printing head is overlapped with the upper end portion of a next band formed by the next scanning of the printing head, and thereby some dots of the lower end portion of the previous band firstly formed are formed during the scanning operation for forming the next band, and some dots of the upper end portion of the next band secondly formed are formed during the scanning operation for forming the previous band. Hereinafter, the process is referred to as a partial overlap (POL) control.

However, sometimes a blank area, in which any dot is not formed in the whole range of a plurality of successive main scanning lines, exists in an image to be formed on a recording medium. In this case, there has been known a technique for shortening printing time by performing a blank skip process which transports the recording medium by a large feed amount depending on a width of the blank area so as to skip the blank area in scanning. However, there is a problem in that image quality of a printed image is deteriorated when the blank skip process is applied during a printing process in which the POL control is being performed. The reason why image quality is deteriorated is that, for example, some dots of the lower portion are not formed and one band formation is terminated when the blank skip process is applied in the case where a nozzle for forming intermittent dots on the lower end portion of a band, and pixels in the boundary portion between the blank area and the image forming area are not printed.

SUMMARY

An advantage of some aspects of the invention is to shorten image forming process time while suppressing deterioration in image quality in an image forming process using POL control.

The invention has been made to solve at least a part of the problem mentioned above, and can be realized as the following form or application example.

Application Example 1

According to an aspect of the invention, a liquid ejecting apparatus includes: a printing head that ejects liquid from a plurality of nozzles to form dots on a recording medium; a head driving section that performs a main scanning for moving the printing head in a main scanning direction; a transporting section that performs a sub-scanning for transporting the recording medium in a sub-scanning direction crossing the main scanning direction; an image forming section that forms an image on the recording medium by repeatedly performing the main scanning of the printing head and the sub-scanning of the recording medium, and forms a first dot formation area by ejecting the liquid from the nozzles during a first main scanning and a second dot formation area adjacent to the first dot formation area by ejecting the liquid from the nozzles during a second main scanning performed after the first main scanning; an overlap control section that performs overlap control for intermittently forming dots on a lower end portion of the first dot formation area and intermittently forming dots on an upper end portion of the second dot formation area so as to make the upper end portion of the second dot formation area overlap with the lower end portion of the first dot formation area and fill spaces between the dots intermittently formed on the lower end portion of the first dot formation area, by controlling the image forming section; an acquiring section that acquires image data; and a cancellation section that cancel the overlap control when a blank area not having any dot in the whole range of a plurality of successive main scanning lines exists and a nozzle forming at least one of the lower end portion of the first dot formation area and the upper end portion of the second dot formation area is positioned at a boundary portion between the blank area and an image forming area having the dots formed thereon, in an image represented by the image data.

In accordance with the liquid ejecting apparatus of Application Example 1, the overlap control is canceled when a nozzle forming at least one of the lower end portion of the first dot formation area and the upper end portion of the second dot formation area is positioned at a boundary portion between the blank area and an image forming area having the dots formed thereon. Accordingly, since the first dot formation area and the second dot formation area are not overlapped with each other, the number of overlapped scannings can be reduced, and the image forming process time can be shortened. Since a dot formation area is formed during a single scanning by the image forming section when the overlap control is canceled, dots are not intermittently formed and successively formed on the lower end portion and the upper end portion of the dot formation area. As a result, it is possible to suppress deterioration in image quality of an image formed on a recording medium in the case of canceling the overlap control.

In the liquid ejecting apparatus of Application Example 1, it is preferable that the image forming section transport the recording medium in the sub-scanning direction, in accordance with a width of the blank area in the sub-scanning direction, after forming the first dot formation area, when the blank area exists. In accordance with the liquid ejecting apparatus of Application Example 1, the recording medium is transported in accordance with a width of the blank area, and thus the number of scannings corresponding to the width of the transported blank area can be reduced. As a result, time necessary to perform scannings of the printing head can be shortened, and thus it is possible to shorten printing time.

In the liquid ejecting apparatus of Application Example 1, it is preferable that the overlap control section perform the overlap control by forming the dots on the lower end portion of the first dot formation area during the first main scanning on the basis of a first arrangement pattern, which is a pattern for arranging the dots, representing intermittent dot arrangement in a region corresponding to the lower end portion of the first dot formation area, and by forming the dots on the upper end portion of the second dot formation area during the second main scanning on the basis of a second arrangement pattern, which is a pattern for arranging the dots, representing intermittent dot arrangement reverse to the intermittent dot arrangement represented by the first arrangement pattern. In accordance with the liquid ejecting apparatus of Application Example 1, dots are intermittently formed on the basis of the arrangement pattern defining intermittent dot arrangement. As a result, the liquid ejecting apparatus of Application Example 1 is capable of forming dots intermittently on the lower end portion of the first dot formation area and the upper end portion of the second dot formation area so as to supplement each other, with a simple configuration.

In the liquid ejecting apparatus of Application Example 1, it is preferable that the cancellation section perform intermittent dot formation in the overlap control by forming dots on the basis of a third arrangement pattern representing successive dot arrangement in a region corresponding to at least one end portion, which is positioned on the boundary portion between the blank area and the image forming area, of the lower end portion of the first dot formation area and the upper end portion of the second dot formation so as to successively form the dots on the at least one end portion. In accordance with the liquid ejecting apparatus of Application Example 1, dots are successively formed on the end portions of the dot formation area positioned on the boundary portion between the blank area and the image forming area, on the basis of the third arrangement pattern different from the dot arrangement pattern used for the overlap control. As a result, the liquid ejecting apparatus of Application Example 1 is capable of easily canceling the intermittent dot formation at the time of the overlap control while suppressing deterioration in image quality of the image formed on the recording medium by separately using the arrangement patterns.

In the liquid ejecting apparatus of Application Example 1, it is preferable that the cancellation section cancel intermittent dot formation in the overlap control by forming dots without use of the first arrangement pattern when the lower end portion of the first dot formation area is positioned on the boundary portion between the blank area and the image forming area and by forming dots without use of the second arrangement pattern when the upper end portion of the second dot formation area is positioned on the boundary portion between the blank area and the image forming area. In accordance with the liquid ejecting apparatus of Application Example 1, the intermittent dot formation at the time of the overlap control is canceled by forming the dot formation area which does not use the dot arrangement pattern. As a result, it is possible to reduce process load of the liquid ejecting apparatus since the nozzle control based on the arrangement pattern is not required in the case of canceling the overlap control.

In the liquid ejecting apparatus of Application Example 1, it is preferable that the cancellation section cancel the overlap control by adjusting an ejecting port for forming the intermittent dots to the blank area. In accordance with the liquid ejecting apparatus of Application Example 1, the blank areas are scanned by the nozzles for intermittently forming dots. Since dots are actually not ejected from the nozzle which scans the blank area, it is possible to cancel the intermittent dot formation in the overlap control while directly using the dot arrangement pattern at the time of the overlap control.

In the invention, the above-mentioned various aspects may be appropriately combined or partially omitted to be applied. The invention may be realized in various forms such as a dot formation method for the liquid ejecting apparatus, a computer program for causing the liquid ejecting apparatus to perform dot formation, and a recording medium having such a computer program readably recorded thereon, other than the above-mentioned configurations of the liquid ejecting apparatus. The above-mentioned aspects can be appropriately applied to any forms. For example, various media such as a flexible disk, a CD-ROM, a DVD-ROM, a magnetic optical disk, an IC card, and a hard disk can be used as the computer-readable recording medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

A. First Example

A1. Configuration of Printing System

Figure 1:
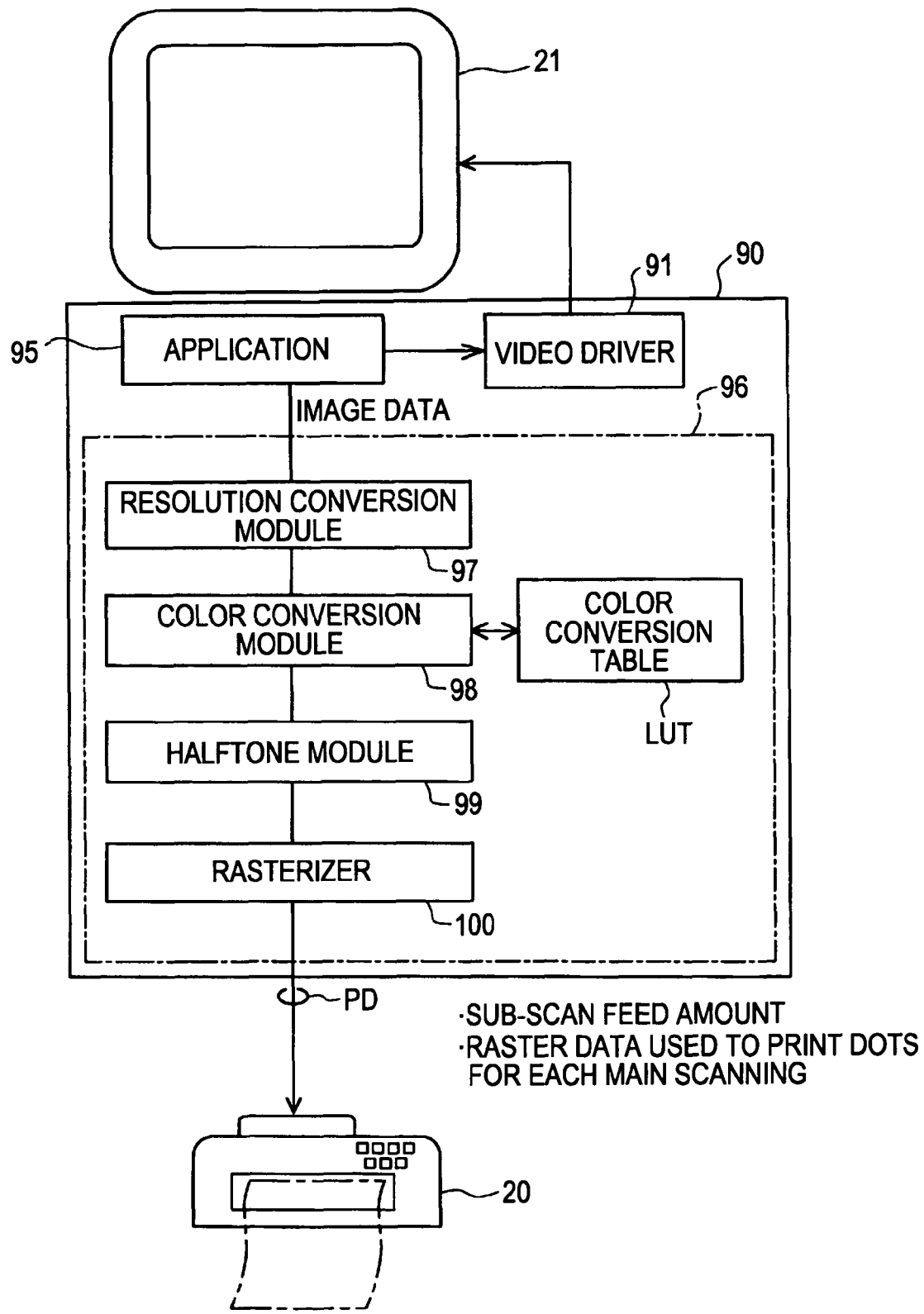
FIG. 1 is a block diagram illustrating a configuration of a printing system according to a first example of the invention.

FIG. 1 is a block diagram illustrating a configuration of a printing system according to a first example of the invention. The printing system includes a computer 90 and a color printer 20. The combination of printer 20 and computer 90 can be called a "liquid ejecting apparatus" in a broad sense. Alternatively, a program, which is installed on the printer 20 and the computer 90 so as to function as a printer driver, may be called the liquid ejecting apparatus in a broad sense. A printer that has a printer driver function may be called the liquid ejecting apparatus.

In the computer 90, an application program 95 is carried out under a predetermined operating system. The operating system contains a video driver 91 or a printer driver 96 incorporated therein, and the application 95 outputs print data PD to be transmitted to the printer 20 with the aid of such a driver. The application program 95 having a function of image retouch and the like performs a desired process on a target image, and displays an image on a CRT 21 with the aid of the video driver 91.

When the application program 95 issues a print command, the printer driver 96 of the computer 90 receives image data from the application program 95, and converts the data into the print data PD supplied to the printer 20. In the example in FIG. 4, the printer driver 96 is provided with a resolution conversion module 97, a color conversion module 98, a halftone module 99, a rasterizer 100, and a color conversion look-up table LUT.

The resolution conversion module 97 has a function of converting a resolution (that is, the number of pixels per unit length) of color image data formed by the application program 95 into a print resolution. The resolution-converted image data is image information still composed of three color components of RGB. The color conversion module 98 converts the RGB image data into multi-tone data of a plurality of ink colors usable in the printer 20 for each pixel, while referring to the color conversion look-up table LUT.

The color-converted multi-tone data has, for example, tone depth of 256 gray scales. The halftone module 99 creates halftone image data by executing a so-called halftone process. The halftone image data is rearranged in an order of data to be transmitted to the printer 20 by the rasterizer 100, and is output as final print data PD. The print data PD includes raster data representing dot printing states at each main scanning and data representing a sub-scan feed amount. In the first example, when a blank area, which does not have any dots in the whole range of a plurality of successive raster lines, exists in a print target image represented by the image data, raster data is created to skip the blank area in scanning by transporting a printing paper in accordance with a width of the blank area in the sub-scanning direction. Specifically, the data includes data representing the sub-scan feed amount depending on the width of the blank area without raster data of the blank area. Hereinafter, in the first example, the control of skipping the blank area in scanning is referred to as "blank skip".

The printer driver 96 corresponds to a program for realizing a function of creating the print data PD. That is, the printer driver 96 corresponds to "image forming section", "overlap control section", and "cancellation section" described in claims. The program for realizing the function of the printer driver 96 is supplied in a state where it is recorded on a computer-readable recording medium. Various media such as a flexible disk, a CD-ROM, a magnetic optical disk, an IC card, a ROM cartridge, a punch card, a printed matter on which codes including a bar-code are printed, and an internal storage device (memory such as RAM or ROM) and an external storage device of computer can be used as the recording medium.

Figure 2:
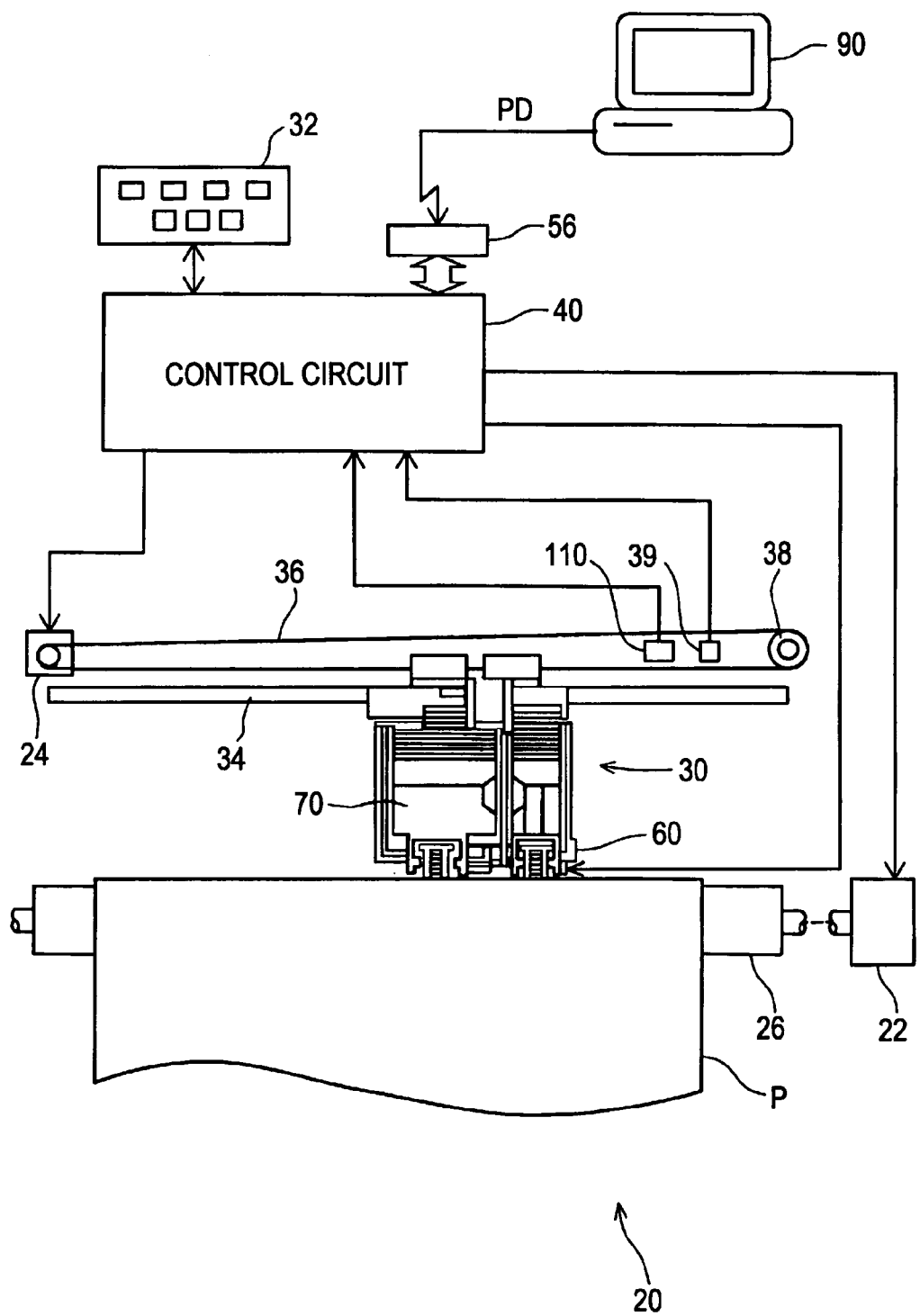
FIG. 2 is a schematic configuration diagram of a printer 20 according to the first example.

FIG. 2 is a schematic configuration diagram of the printer 20 according to the first example. The printer 20 has a sub-scan moving mechanism that transports a printing paper P in the sub-scanning direction by the paper feeding motor 22, a main-scan moving mechanism that reciprocates a carriage 30 in a axial direction (main scanning direction) of a platen 26 by the means of a carriage motor 24, a head driving mechanism that controls dot formation and ink ejection by driving a printing head section 60 mounted on the carriage 30, and a control circuit 40 that exchanges signals among the paper feeding motor 22, the carriage motor 24, the printing head section 60, and an operation panel 32. The control circuit 40 is connected to the computer 90 via a connector 56.

The sub-scan moving mechanism that transports a printing paper P has a gear train (not shown) that transfers rotation of the paper feeding motor 22 to the platen 26 and a printing paper transport roller (not shown). The main-scan moving mechanism that reciprocates the carriage 30 has a sliding shaft 34 that is installed in parallel to an axis of the platen 26 to slidably hold the carriage 30, a pulley 38 that tenses an endless driving belt 36 from the carriage motor 24, and a position sensor 39 that detects the original position of the carriage 30.

Figure 3:
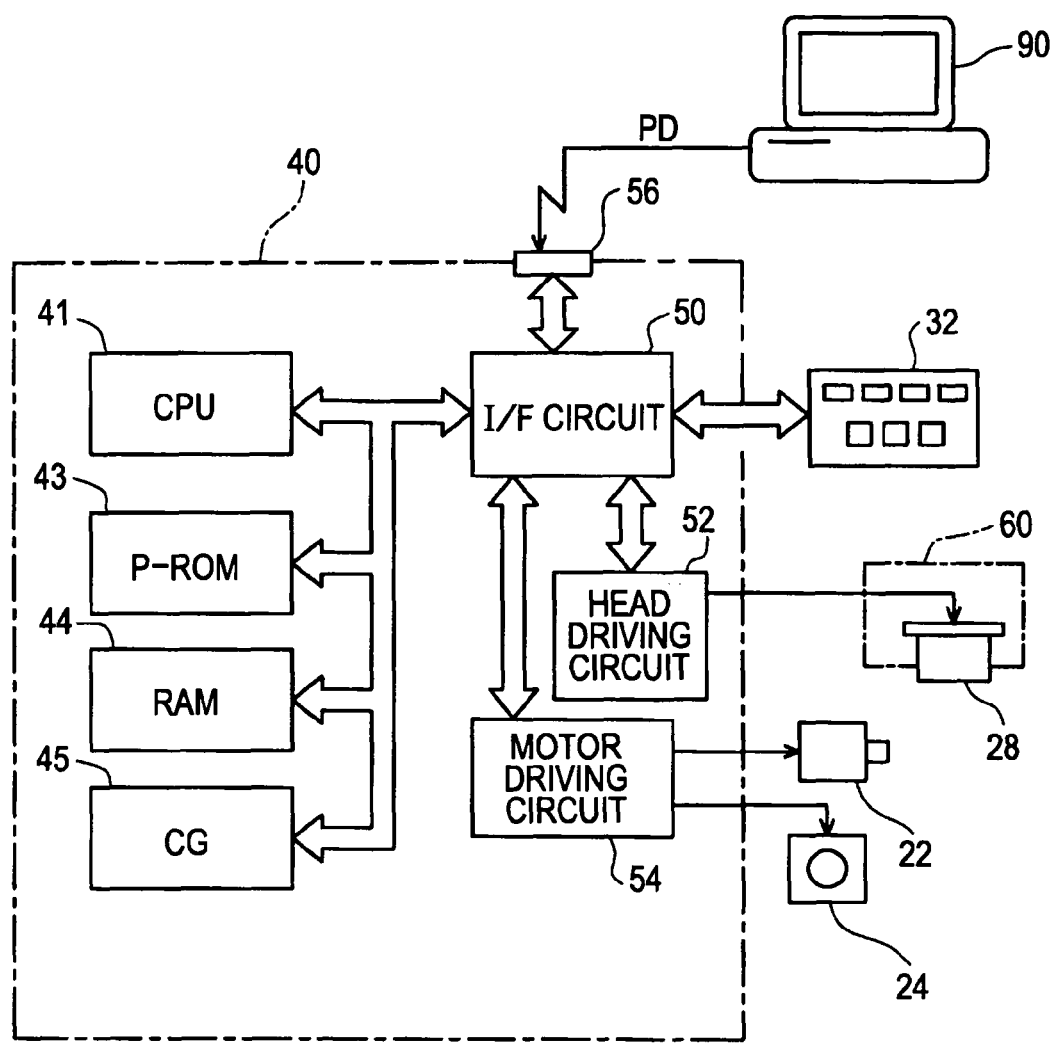
FIG. 3 is a block diagram illustrating the printer 20 by focusing attention on a control circuit 40 according to the first example.

FIG. 3 is a block diagram illustrating the printer 20 by focusing attention on the control circuit 40 according to the first example. The control circuit 40 is configured as an arithmetic logic operation circuit that has a CPU 41, a programmable ROM (PROM) 43, a RAM 44, and a character generator (CG) 45 containing dot matrices of characters. The control circuit 40 further includes a I/F circuit 50 that creates a dedicated interface with external motors and the like, a head drive circuit 52 that is connected to the I/F circuit 50 and is adapted to eject ink by driving the printing head unit 60, and a motor driving circuit 54 that drives the paper feeding motor 22 and the carriage motor 24. The I/F circuit 50 has a parallel interface circuit built therein and is capable of receiving print data PD from the computer 90 via the connector 56. The color printer 20 prints images in accordance with the print data PD. The RAM 44 functions as a buffer memory for the temporary storage of raster data.

The printing head unit 60 has a printing head 28 and is capable of mounting ink cartridges. The printing head unit 60 can be mounted on the color printer 20 and removed as a single component. In other words, the printing head unit 60 is replaced when the printing head 28 needs to be replaced.

Figure 4:
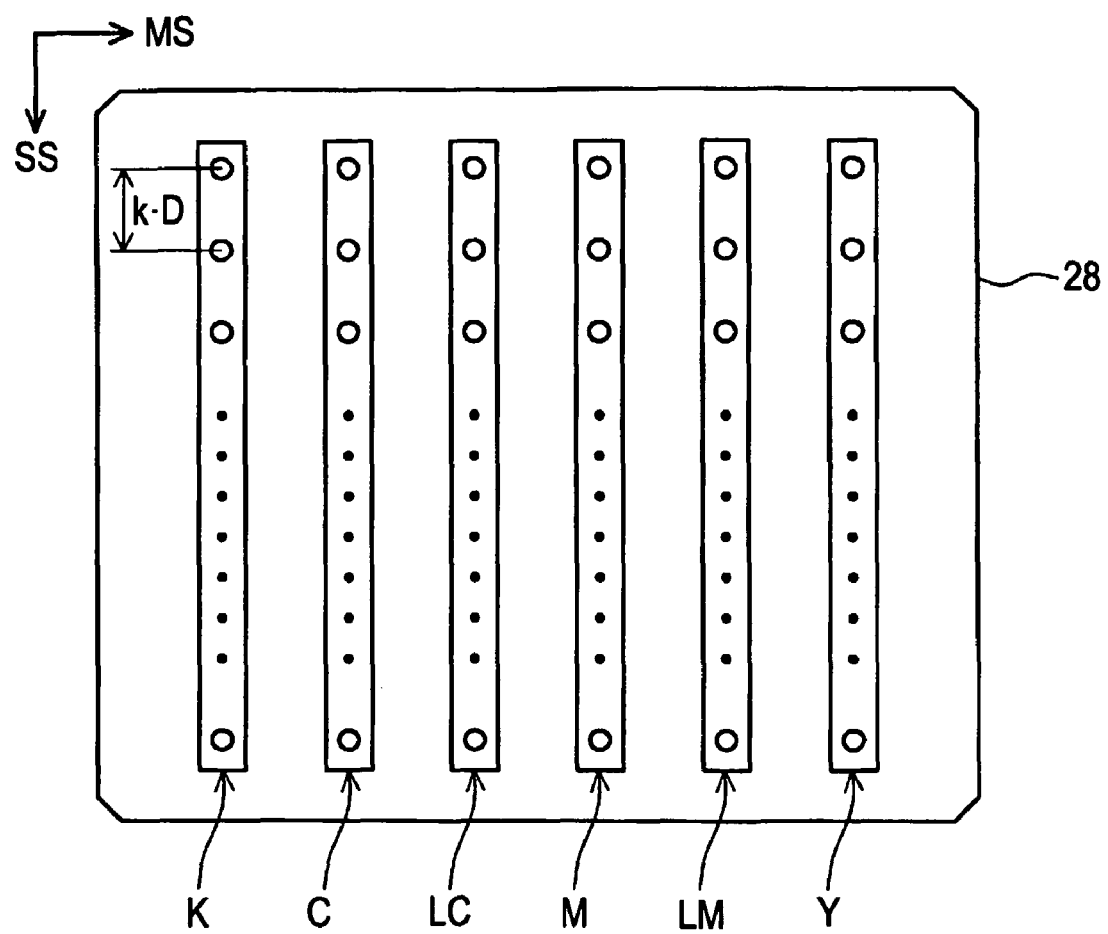
FIG. 4 is an explanatory diagram illustrating nozzle arrangement on the lower surface of a printing head 28 according to the first example.

FIG. 4 is an explanatory diagram illustrating nozzle arrangement on the lower surface of the printing head 28 according to the first example. The lower surface of the printing head 28 is provided with the following nozzles for ejecting color inks: a nozzle array K for ejecting black ink, a nozzle array C for ejecting dark cyan ink, a nozzle array LC for ejecting light cyan ink, a nozzle array M for ejecting dark magenta ink, a ink nozzle array LM for ejecting light magenta ink, and a nozzle array Y for ejecting yellow ink.

The plurality of nozzles in each nozzle array are arranged at a constant nozzle pitch k-D in a sub-scanning direction SS. Here, D is a pitch (it is referred to as a "dot pitch") that corresponds to print resolution in the sub-scanning direction. In the specification, it can be said that "the nozzle pitch is k dots". The unit, dot is defined as a dot pitch of print resolution. The dot as unit thereof is also used in the sub-scan feed amount.

Each nozzle is provided with a piezoelectric element (not shown) as a driving element for driving the nozzle to discharge ink droplets. During printing, ink droplets are discharged from each nozzle while the print head 28 moves in the main scanning direction MS.

In the color printer 20 having the hardware configuration mentioned above, the carriage 30 is reciprocated by the carriage motor 24 while the printing paper P is transported by the paper feeding motor 22, simultaneously the piezoelectric elements of the printing head 28 is driven to eject color ink droplets, and then ink dots are formed, thereby forming a multi-color multi-tone image on the printing paper P. In the first example, printing is performed by using a printing method referred to as "band printing".

A2. Overlap Control

Figure 5:
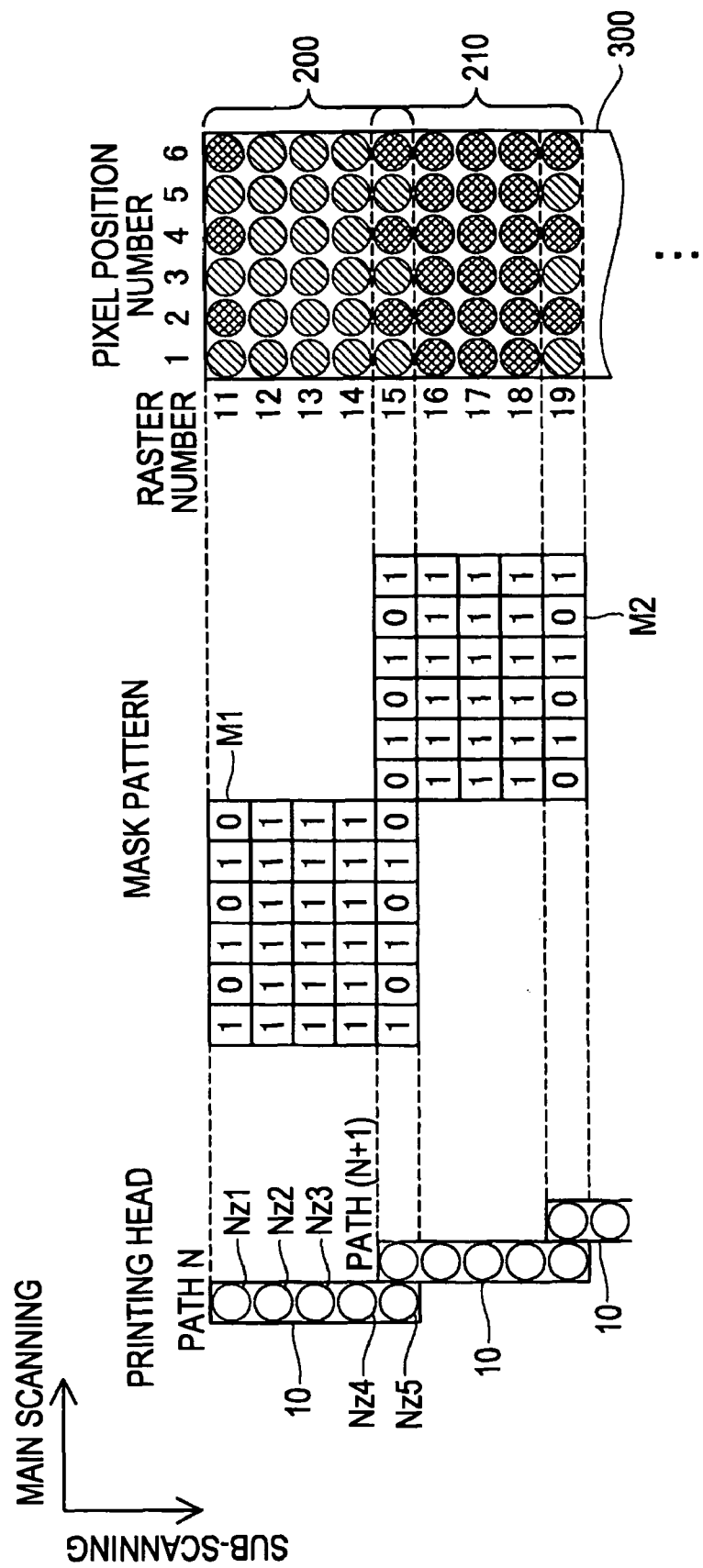
FIG. 5 is an explanatory diagram explaining a band printing method according to the first example.

FIG. 5 is an explanatory diagram explaining the band printing method according to the first example. In the band printing method, generally, dots are formed in an area corresponding to a head height (=the number of nozzles×nozzle pitch) of the printing head by dot formation during a single scanning (forward operation or backward operation) of the printing head. Hereinafter, the area including dots formed during the single scanning is referred to as a dot formation area. In the operation of transporting a printing paper after the single scanning, the paper is transported by a distance corresponding to the height of the head, and the band-like dot formation areas are spliced to each other in the transporting direction for each dot formation operation, thereby forming an image on the paper. In the following examples, the band-like dot formation area is just referred to as "band".

In the first example, overlap control is performed in order to suppress deterioration in image quality caused by stripes appearing at the boundaries between the dot formation areas during the printing process using the band printing method. The overlap control is, in two dot formation areas which are successive, a control for forming dots intermittently on the lower end portion of a first dot formation area 200 and forming dots intermittently on the upper end portion of a second dot formation area 210 so as to make the upper end portion of the second dot formation area 210 overlap with the lower end portion of the first dot formation area 200 and fill spaces between the dots intermittently formed on the lower end portion of the first dot formation area 200. The overlap control is realized by controlling an amount of transporting the printing paper or the nozzles for forming dots. Hereinafter, in the specification, the overlap control is referred to as a partial overlap (POL) control.

In FIG. 5, "path N" denotes Nth scanning of the printing head (N is an integer not less than 2). An image 300 denotes an image formed on the printing paper by the band printing method. FIG. 5 shows an example in which an image having a width corresponding to 6 pixels in the main scanning direction is printed by use of 5 nozzles. FIG. 5 shows the case of using 5 nozzles, but actually the printing head 28 has 360 nozzles. In the first example, a mask pattern M1 is used during Nth, (N+2)th, (N+4)th . . . scannings, and a mask pattern M2 is used during (N+1)th, (N+3)th . . . scannings. In FIG. 5, the diagonal hatching denotes pixels formed at Nth (N is an odd number) path and odd-numbered paths after the Nth path, and the cross hatching denotes pixels formed at (N+1)th path and after even-numbered paths after the (N+1)th path. In FIG. 5, the pixel position number is a number of the pixel formed at the corresponding position. Hereinafter, in the specification, a pixel formed at a position having the pixel position number of "1" is referred to as a first pixel.

For example, the first dot formation area 200 including the raster lines of raster Nos. 11 to 15 is formed during the Nth scanning of the printing head 28 as shown in FIG. 5. During the Nth scanning, dots of the raster line of raster No. 11 of the upper end portion of the first dot formation area 200 and the raster line of raster No. 15 of the lower end portion thereof are formed intermittently. Specifically, the first, third, and fifth pixels of the raster lines of raster Nos. 11 and 15 and the all the pixels of the raster lines of raster Nos. 12 to 14 are formed by the Nth scanning of the printing head 28 as shown in FIG. 5. The second, fourth, and sixth pixels of the raster line of raster No. 11 of the first dot formation area 200 are formed during the (N−1)th scanning of the printing head 28.

The intermittent dot formation in the raster lines of raster Nos. 11 and 15 is realized by adopting a configuration in which the printer driver 96 creates the print data PD by using a mask pattern M1 representing arrangement pattern of dots in the dot formation area, and the printing head forms dots on the basis of the created print data PD.

Figure 6:
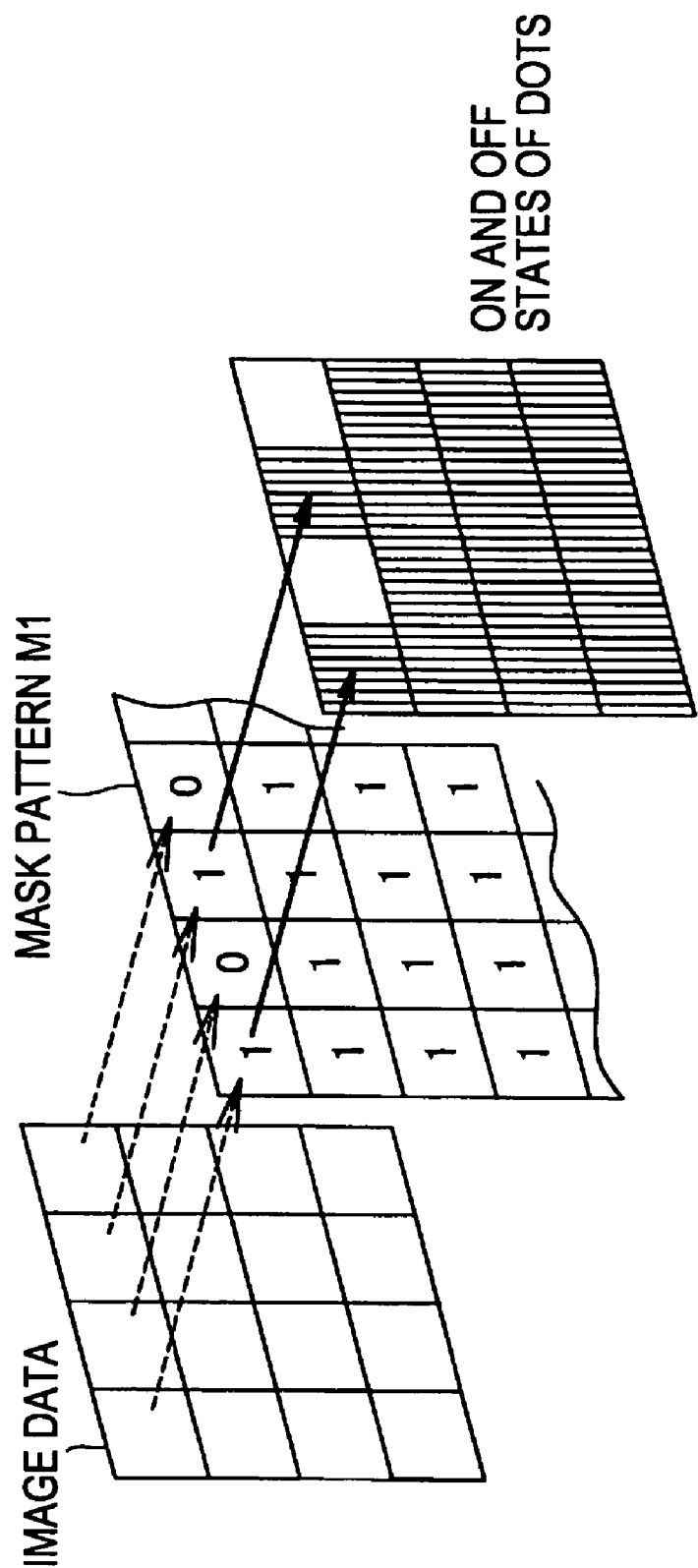
FIG. 6 is an explanatory diagram explaining determination as to dot formation based on a mask pattern according to the first example.

FIG. 6 is an explanatory diagram explaining determination as to dot formation based on the mask pattern according to the first example. In the drawing, only some components are shown for explanatory convenience. In the mask pattern M1, values of 1 or 0 are stored at positions corresponding to pixels of an image represented by image data as shown in FIG. 5. In the process of determination as to dot formation, a dot is formed if "1" is stored at a position corresponding to a pixel of the image represented by the image data in the mask pattern M1, and no dot is formed at a position where "0" is stored. Regarding a mask pattern M2, similarly, a dot is formed if "1" is stored at a position corresponding to a pixel of the image represented by the image data in the mask pattern M2, and no dot is formed at a position where "0" is stored. In FIG. 6, each hatched pixel represents a target pixel of dot formation. As described above, by using the mask pattern M1, it is possible to determine whether or not to perform dot formation for each pixel in a simple process of determining which one of "1" and "0" is stored at each position corresponding to each pixel of the image represented by the image data in the mask pattern. Accordingly, it is possible to promptly perform the intermittent dot formation. Hereinafter, in the specification, a nozzle for forming a raster where dots are intermittently formed is referred to as a "POL nozzle" or "masked nozzle". In the first example, the nozzles Nz1 and Nz5 correspond to the POL nozzle, as shown in FIG. 5. Although not shown in FIG. 6, actually, a pattern other than the mask pattern shown in FIG. 6 may be used in the mask process. For example, although the mask pattern in FIG. 6 is configured such that values of 1 and 0 are alternately arranged in series at an interval of one pixel in the first row of the mask pattern, the mask pattern may be configured such that the values are arranged in series at an interval of two pixels. A mask pattern of irregular arrangement may be used instead of the mask pattern in which values of 0 and 1 are regularly arranged in series. Even in such a case, the mask patterns are created such that, for example, pixels in the mask pattern M2 corresponding to the pixels having values of 0 in the mask pattern M1 in FIG. 5 have values of 1.

Returning to FIG. 5, description of the POL control will be followed. The second dot formation area 210 including the raster lines of raster Nos. 15 to 19 are formed adjacent to the first dot formation area 200 during (N+1)th scanning of the printing head 28. During the (N+1)th scanning, dots of the raster line of raster No. 15 of the upper end portion of the second dot formation area 210 and the raster line of raster No. 19 of the lower end portion thereof are intermittently formed to fill spaces between the dots intermittently formed on the raster line of raster No. 15 included in the first dot formation area 200. Specifically, the second, fourth, and sixth pixels of the raster lines of raster Nos. 15 and 19 and the all the pixels of the raster lines of raster Nos. 16 to 18 are formed by the (N+1)th scanning of the printing head 28 as shown in FIG. 5. The first, third, and fifth pixels of the raster line of raster No. 19 of the second dot formation area 210 are formed during the (N+2)th scanning of the printing head 28.

As described above, the printer 20 is configured such that dots are formed to supplement each other by making the lower end portion of the first dot formation area 200 overlap with the upper end portion of the second dot formation area 210. By adopting such a configuration, it is possible to suppress occurrence of stripes that may appear at the boundaries between the dot formation areas 200 and 210.

A3. Printing Process

Figure 7:
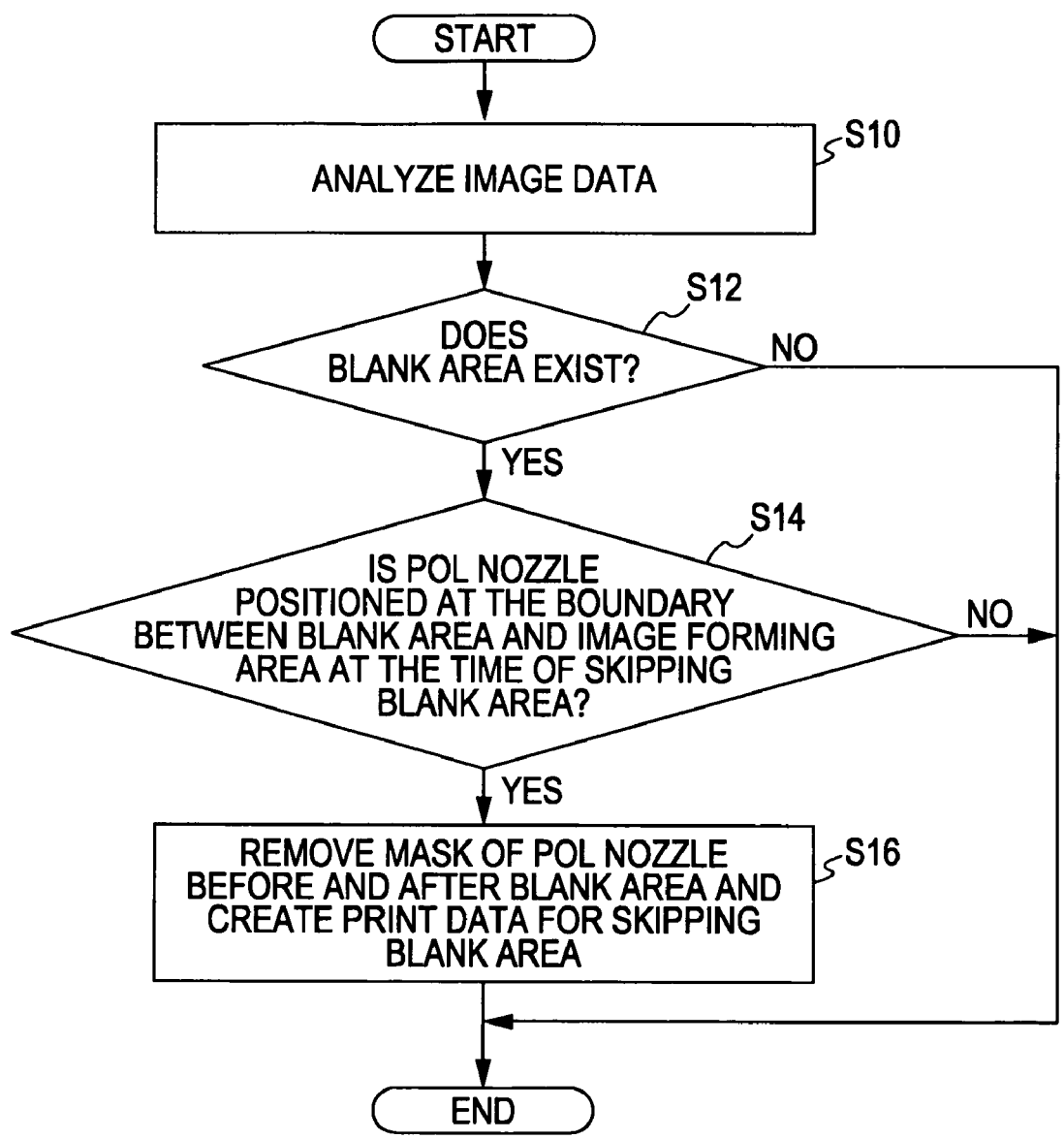
FIG. 7 is a flowchart explaining a process of creating print data PD according to the first example.
Figure 8:
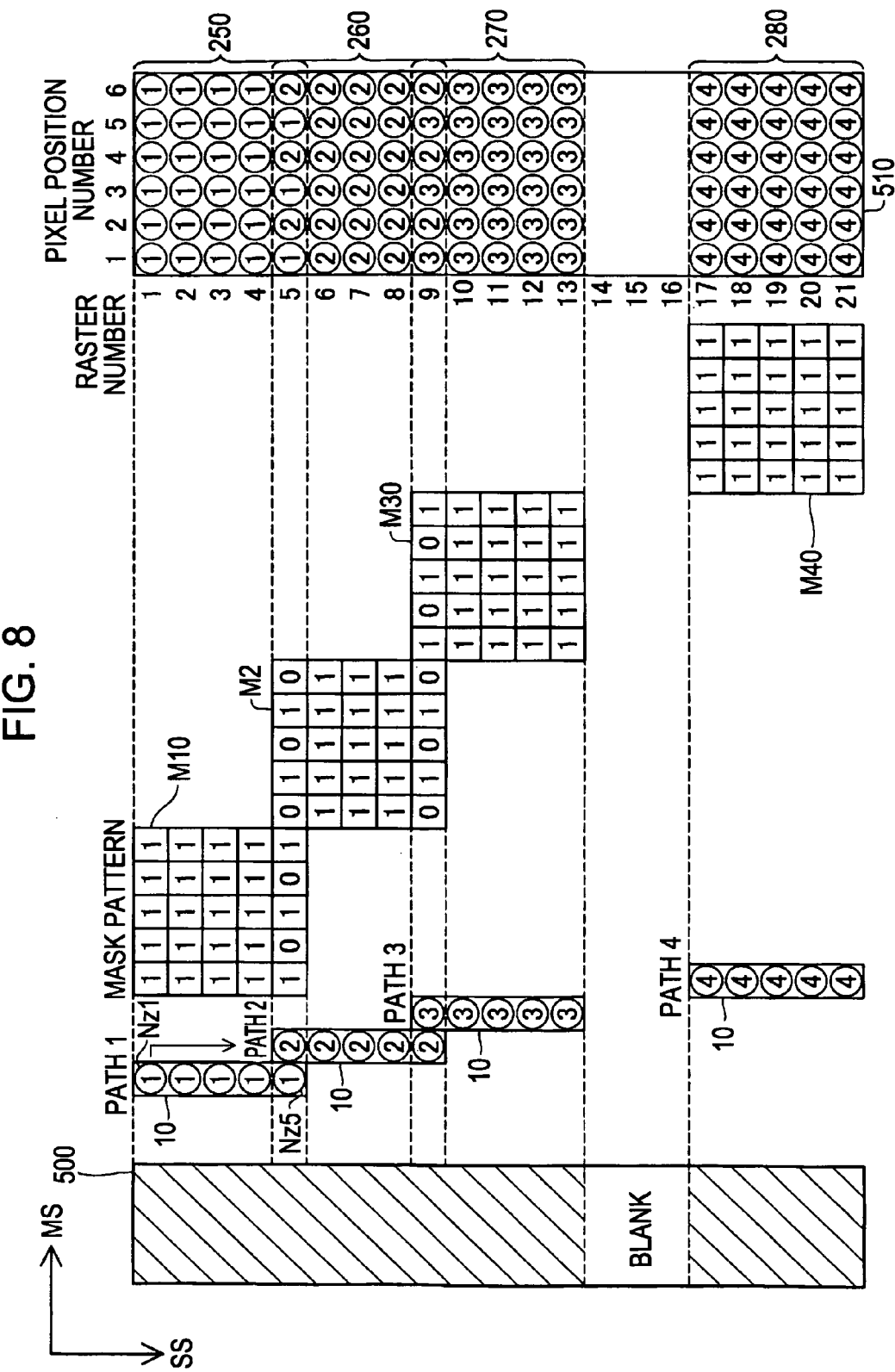
FIG. 8 is an explanatory diagram explaining cancellation of POL control at the time of applying a blank skip process according to the first example.

A printing process in the first example will be described with reference to FIGS. 7 and 8. FIG. 7 is a flowchart explaining a process of creating print data PD according to the first example. FIG. 8 is an explanatory diagram explaining cancellation of POL control at the time of applying a blank skip process according to the first example. The printer driver 96 executes the process of creating print data PD in FIG. 7.

The printer driver 96 analyzes image data acquired from the application program 95 (step S10), and determines whether a blank area exists in an image represented by the image data (step S12).

If the blank area exists in the image represented by the image data (step S12: YES), the printer driver 96 determines whether or not a POL nozzle is positioned on the boundary portion between the blank area and the image forming area (area other than the blank area) on which the image is formed, at the time of skipping the blank area on the basis of the blank skip control (step S14). In this example, if the print data PD of the Nth scanning is created, the printer driver 96 determines whether or not the blank area exists and whether or not the blank is skipped by scanning image data corresponding to a width of two bands from a leading position of the Nth scanning. In this example, the blank skip process is performed if the blank area (successive two or more blank raster lines) exists, but the blank skip process may be performed only if a width of the blank area in the sub-scanning direction is not less than a width of one band.

If the POL nozzle is positioned at the boundary between the blank area and the image forming area (step S14: YES), the printer driver 96 cancels the POL control before and after the blank area, and creates the print data PD for skipping the blank area (step S16). Cancellation of the POL control is that overlap between the end portions of the dot formation areas adjacent to each other is not performed, and dots are successively formed on the end portions without performing intermittent dot formation. The print data PD includes raster data representing a dot printing state at each main scanning and data representing a sub-scan feed amount including a distance corresponding to the total length of pixels depending on a blank area. Regardless of whether the blank area exists or does not exists in the image represented by the image data (step S12: NO), the printer driver 96 continues the normal POL control if, the POL nozzle is positioned at the boundary between the blank area and the image forming area (step S14: NO).

FIG. 8 schematically shows the printing process of the image in which a blank area exists. In FIG. 8, solid-line circular marks including numerals of the printing head 28 denote nozzles, the numerals denote paths. An image 500 denotes an image represented by image data to be printed. An image 510 denotes an image obtained by printing the image 500 on a printing paper, and solid-line circular marks including numerals in the image 510 correspond to pixels of the image 510. The numerals in the circular marks denoting the pixels denote paths in which the pixels are formed. The nozzles (in the first example, the first nozzle Nz1 and the fifth nozzle Nz5) forming the upper and lower end portions of the dot formation areas are POL nozzles used in intermittent dot formation in the POL control.

During the first scanning (path 1), dots of the raster lines having the raster Nos. of 1 to 5 are formed, and a dot formation area 250 is formed. The raster line of the raster No. 1 is the upper end portion of the dot formation area 250, but is the leading portion in the image to be printed at the first scanning, and thus dots are not formed intermittently and formed successively. Since the area printed by the second scanning (path 2) is not a blank, dots are intermittently formed on the lower end portion of the dot formation area 250. Specifically, the print data PD for the first scanning is created by a mask pattern M10 configured such that the nozzle Nz1 forming the raster line of the raster No. 1 is not masked and the nozzle Nz5 forming the raster line of the raster No. 5 is masked. During the first scanning, dots corresponding to all the pixels (pixel position Nos. 1 to 6) of raster Nos. 1 to 4 and pixels of pixel position Nos. 1, 3, and 5 of raster No. 5 are formed on the basis of the print data PD created in this manner.

When the first scanning is terminated, in the first example, the printing paper is transported in the sub-scanning direction by a distance corresponding to four raster lines such that the nozzle Nz1 is positioned above the raster line of raster No. 5.

During the second scanning (path 2), dots of the raster lines of raster Nos. 5 to 9 are formed, and a dot formation area 260 is formed. Since both sides of the upper end portion and lower end portion of the dot formation area 260 in the sub-scanning direction is not positioned at the boundary between the blank area and the image forming area, dots are intermittently formed on the upper end portion (raster line of raster No. 5) and the lower end portion (raster line of raster No. 9) of the dot formation area 260 by the normal POL control. Specifically, the print data PD for the second scanning is created on the basis of the mask pattern M2 for masking the nozzle Nz1 forming the raster line of raster No. 5 and the nozzle Nz5 forming the raster line of raster No. 9. During the second scanning, dots are formed at pixel positions of pixel position Nos. 2, 4 and 6 in the raster line of raster No. 5, pixel positions of all the pixels (pixel position Nos. 1 to 6) in the raster lines of raster Nos. 6 to 8, and pixel positions of pixel position Nos. 2, 4 and 6 in the raster line of raster No. 9, on the basis of the print data PD created in this manner.

When the second scanning is terminated, in the first example, the printing paper is transported in the sub-scanning direction by a distance corresponding to four raster lines, similarly to the termination of the first scanning.

During the third scanning (path 3), dots of the raster lines of raster Nos. 9 to 13 are formed, and a dot formation area 270 is formed. Since the upper end portion of the dot formation area 270 is not positioned at the boundary between the blank area and the image forming area, dots are intermittently formed by the POL control on the upper end portion of the dot formation area 270. By contrast, since the lower end portion of the dot formation area 270 is positioned at the boundary between the blank area and the image forming area, the POL control is canceled.

The cancellation of the POL control is, specifically, that the POL control is canceled by creating the print data PD on the basis of the mask pattern configured such that the nozzle Nz forming the raster line of the non-overlapped end portion is not masked.

In the first example, the print data PD for the third scanning is created on the basis of a mask pattern M30 configured such that the nozzle Nz1 forming the raster line of raster No. 9 is masked and the nozzle Nz5 forming the raster line of raster No. 13 is not masked. During the third scanning, dots are formed at pixel positions of the pixel position Nos. 1, 3 and 5 in the raster line of raster No. 9 and pixel positions of all the pixels (pixel position Nos. 1 to 6) in the raster lines of raster Nos. 10 to 13, on the basis of the print data PD created in this manner.

When the third scanning is terminated, the printing paper is transported by a width of the blank area in the sub-scanning direction, and the blank area is skipped in reading, by the blank skip process. In the first example, since the blank area corresponds to a width of three raster lines as shown in FIG. 8, the printing paper is transported by a distance corresponding to seven raster lines obtained by adding three raster lines of the blank area to four raster lines normally transported. As a result, the nozzle Nz1 of the printing head 28 is positioned above the raster line of raster No. 17.

During the fourth scanning (path 4), dots of the raster lines of raster Nos. 17 to 21, and a dot formation area 280 is formed. Since the upper end portion of the dot formation area 280 is positioned at the boundary between the blank area and the image forming area, dots are not intermittently formed and successively formed on the upper end portion of the dot formation area 280. Since the lower end portion of the dot formation area 280 is the tailing portion of the image, the dots are formed successively. Specifically, the print data PD for the fourth scanning is created on the basis of a mask pattern M40 configured such that all the nozzles Nz1 to Nz5 are not masked. During the fourth scanning, dots are formed at pixel positions of all the pixels (pixel position Nos. 1 to 6) in the raster lines of raster Nos. 17 to 21, on the basis of the print data PD created in this manner.

In the first example, the print data PD may be created without use of the mask pattern itself when dots are successively formed on the both sides of the upper and lower end portions of the dot formation area (in the case of dot formation area 280 as described above). In this manner, it is possible to shorten time necessary to create the print data, and thus it is possible to shorten printing process time.

Figure 9:
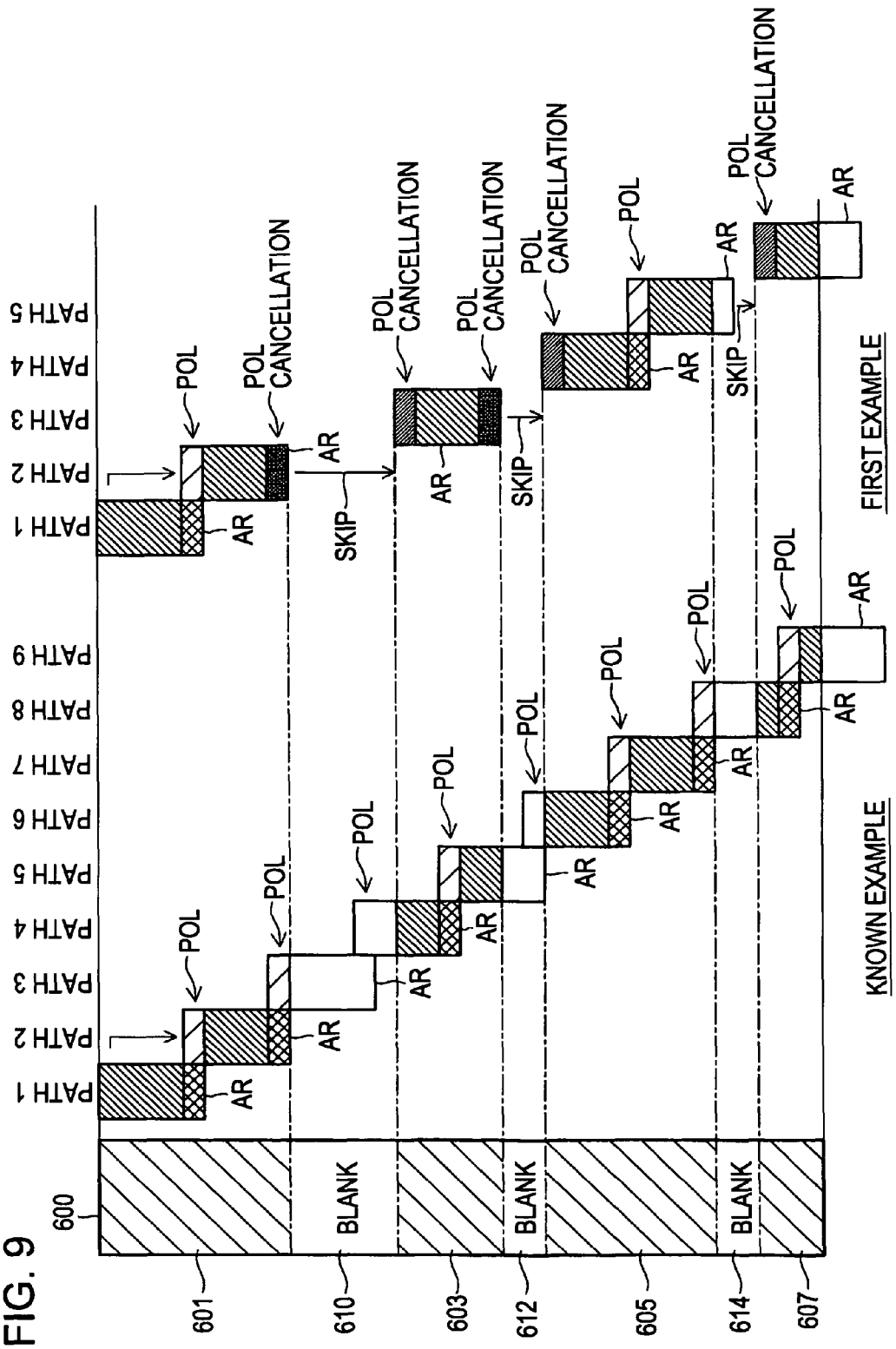
FIG. 9 is an explanatory diagram explaining comparison in number of paths between the first example and a known example.

FIG. 9 is a diagram of comparison in number of paths between a known example and the first example when an image 600 as a print target includes blank areas. FIG. 9 shows the number of scannings (the number of paths) of the printing head 28 needed until a printing of the image 600 is complete. In FIG. 9, the diagonal hatching parts of dot formation areas AR denote raster lines in which dots are successively formed regardless of the POL control, and the cross hatching parts thereof denote raster lines in which dots are intermittently formed by the POL control. The solid hatching parts denote raster lines in which the POL control is canceled. The image 600 includes image forming areas 601, 603, 605, and 607, and blank areas 610, 612, and 614, as shown in FIG. 9.

In the known example, cancellation of the POL control is not considered. Thus, if the blank skip process is performed, a stripe appears at the boundary between the blank area and the image forming area, thereby deteriorating image quality. For this reason, in the known example, an image is formed by performing the band printing and the POL control without performing the blank skip process even if the image 600 includes blanks as shown in FIG. 9. As a result, nine scannings (nine paths) are needed in order to complete the printing of the image 600.

By contrast, in the first example, if the blank area exists, printing is performed with the POL control canceled, and the blank skip process is performed before and after the blank area, while an image is formed by performing the band printing and the POL control. As a result, the printing of the image 600 can be completed within sixth scannings (six paths). Accordingly, it is possible to shorten printing process time as compared with the known example.

According to the printing system of the first example mentioned above, in the band printing method, to which the POL control is applied, the POL control is canceled when the POL nozzle forming at least one of the lower end portion of the first dot formation area 200 and the upper end portion of the second dot formation area 210 is positioned at the boundary between the blank area and the image forming area in which dots are formed. Accordingly, dots of the raster line formed by the POL nozzle during a single scanning are successively formed without making the first dot formation area 200 overlap with the second dot formation area 210 when the POL nozzle is positioned at the boundary between the blank area and the dot formation area. As a result, it is possible to suppress deterioration in image quality of an image formed on a recording medium.

According to the printing system of the first example, by applying the blank skip process of transporting the printing paper in accordance with a width of the blank area, it is possible to reduce the number of scannings corresponding to the width of the transported blank area. As a result, it is possible to shorten time necessary for the scanning of the printing head, and thus it is possible to shorten printing time.

According to the printing system of the first example, by using a mask pattern different from the mask patterns M1 and M2 used for the POL control at the time of the POL cancellation, dots can be successively formed on the end portion of the dot formation area positioned at the boundary between the blank area and the image forming area. As a result, by separately using mask patterns, it is possible to cancel POL control without difficulty while suppressing deterioration in image quality of an image formed on a paper.

B. Second Example

In second example, transport of a printing paper is controlled so as to position a nozzle, which is not masked, above the boundary between the blank area and the image forming area in cancellation of the POL control at the time of the blank skip control when an image as a printing target includes a blank area.

B1. Printing Process

Figure 10:
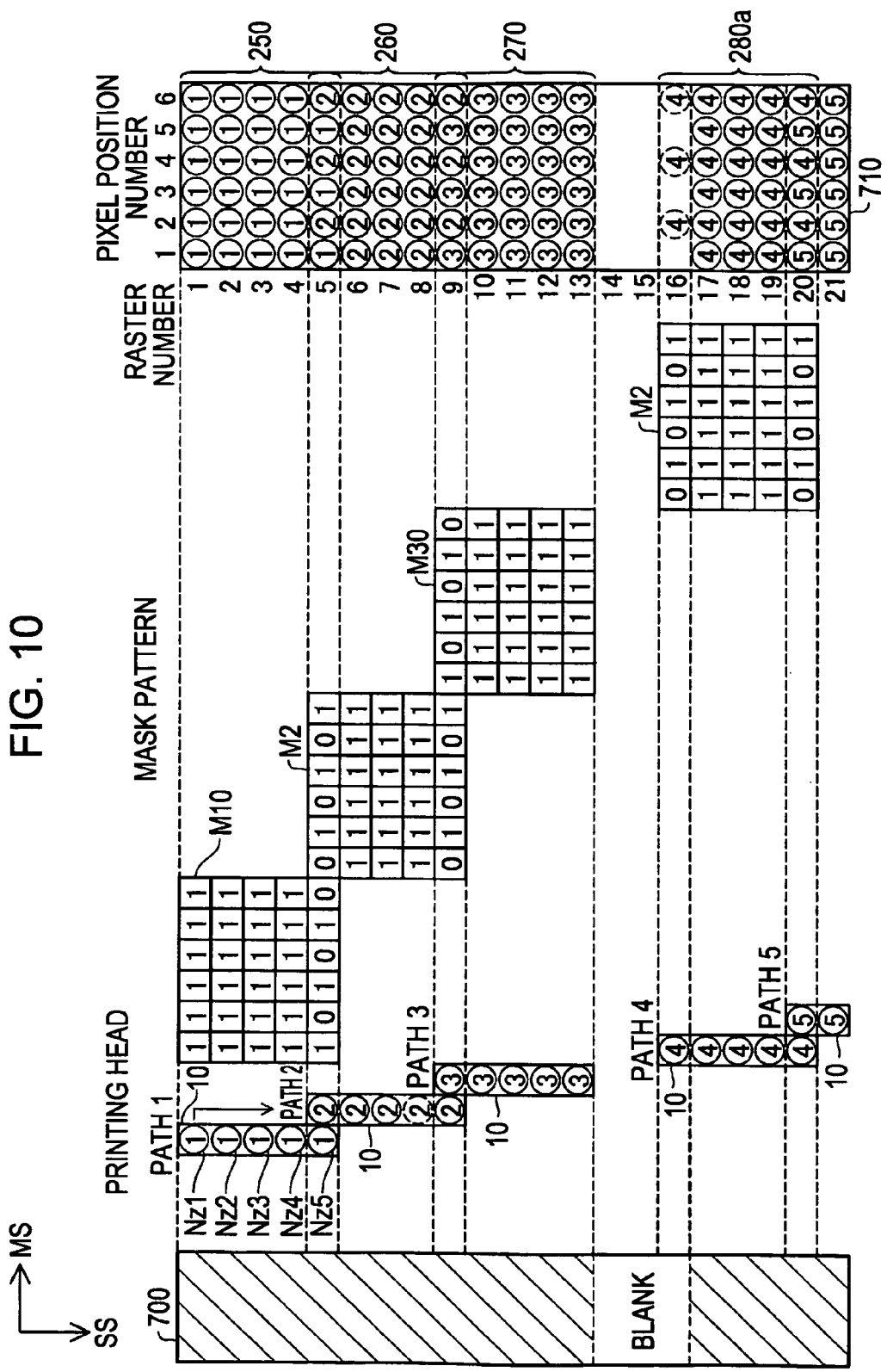
FIG. 10 is an explanatory diagram explaining cancellation of POL control at the time of applying a blank skip process according to a second example.

FIG. 10 is an explanatory diagram explaining cancellation of POL control at the time of applying a blank skip process according to a second example. In FIG. 10, solid-line circular marks including numerals of the printing head 28 denote nozzles, the numerals denote paths. An image 700 denotes an image represented by image data to be printed, and an image 710 denotes an image obtained by printing the image 700 on a printing paper. Solid-line circular marks including numerals in the image 710 correspond to pixels of the image 710. The numerals in the circular marks denoting the pixels denote paths in which the pixels are formed. The nozzles (in the second example, the first nozzle Nz1 and the fifth nozzle Nz5) forming the upper and lower end portions of the dot formation areas are used in intermittent dot formation in the POL control. The image 700 is an image having the same blank areas and image forming areas as the image 500 in the first example.

Since the first to the third scannings are the same processes as those in the first example, description thereof will be omitted.

When the third scanning is terminated, the printing paper is transported by a width of the blank area in the sub-scanning direction, and the blank area is skipped in reading, by the blank skip process. In the second example, at the time of the fourth scanning, the printing paper is transported by a distance corresponding to six raster lines obtained by adding two raster lines, which are necessary to position a nozzle other than the POL nozzles of the printing head 28 on the upper end portion of the image forming area, to four raster lines normally transported. As a result, the nozzle Nz2 other than the POL nozzles is positioned on the leading end portion of a blank area and the image forming area next to the blank area. The nozzle Nz2 successively forms dots of one raster line.

During the fourth scanning (path 4), dots of the raster lines of raster Nos. 17 to 20, and a dot formation area 280a is formed. The nozzle Nz2 successively forming dots of one raster line on the upper end portion of the dot formation area 280a is positioned on the upper end portion. Accordingly, dots are successively formed on the upper end portion of the dot formation area 280a. The print data PD for the fourth scanning is created on the basis of the mask pattern M2 used for the normal POL control. During the fourth scanning, dots are formed at pixel positions of all the pixel (pixel position Nos. 1 to 6) in the raster lines of raster Nos. 17 to 19 and pixel positions of pixel position Nos. 2, 4, and 6 in the raster line of raster No. 20, on the basis of the print data PD created in this manner. Since the POL nozzle is positioned on the raster line of raster No. 16, the nozzle performs scanning on the raster line as indicated by the dotted line, but the raster line is included in the blank area, and thus dots are not formed.

During the fifth or more scannings, image is formed by appropriately forming the POL control and blank skip process.

According to the printing system of the second example as described above, the nozzles other than the POL nozzles are capable of forming dots corresponding to the end portions of the blank area and the image forming area by controlling the transport of the printing paper. Accordingly, it is possible to remove a mask while using the mask pattern used at the time of the POL control. As a result, it is possible to reduce the number of the mask patterns used at the time of creating the print data PD, and thus it is possible to achieve reduction in process load and memory saving.

C. Modified Example

1. In the examples mentioned above, the mask patterns define whether or not to perform dot formation of all dots which can be formed by a single scanning, but it may be possible to use a mask pattern defining whether or not to perform dot formation of dots which is formed, for example, by the POL nozzles. That is, the nozzles other than the POL nozzles successively form dots of the corresponding raster lines in any case. By adopting such a configuration, it is possible to reduce load of the process of creating the print data PD on the basis of the mask patterns.

2. In the examples mentioned above, at the time of creating the print data PD of the Nth scanning, it is determined whether or not the blank area exists and whether or not the blank is skipped by scanning image data corresponding to a width of two bands from a leading position of the Nth scanning, and the mask pattern is changed depending on the determination result, thereby creating the print data PD. However, for example, widths and positions of blank areas in the whole image data are searched at the beginning, and print data PD of all the paths may be created before dot formation. By adopting such a configuration, it is possible to create print data PD having high efficiency in printing on the basis of the widths and arrangement distance of blank areas.

3. In the examples mentioned above, the POL nozzle is used as a nozzle for forming one raster line on the upper end or the lower end, but a plurality of nozzles for forming a plurality of raster lines may be used as the POL nozzle.

As described above, the invention has been illustrated and described with respect to several examples thereof, but the invention is not limited to these examples, and may be modified in various forms without departing from the technical spirit thereof.

What is claimed is:

1. A liquid ejecting apparatus comprising:
   a printing head that ejects liquid from a plurality of nozzles to form dots on a recording medium;
   a head driving section that performs a main scanning for moving the printing head in a main scanning direction;
   a transporting section that performs a sub-scanning for transporting the recording medium in a sub-scanning direction crossing the main scanning direction;
   an image forming section that forms an image on the recording medium by repeatedly performing the main scanning of the printing head and the sub-scanning of the recording medium, and forms a first dot formation area by ejecting the liquid from the nozzles during a first main scanning and a second dot formation area adjacent to the first dot formation area by ejecting the liquid from the nozzles during a second main scanning performed after the first main scanning;
   an overlap control section that performs overlap control for intermittently forming dots on a lower end portion of the first dot formation area and intermittently forming dots on an upper end portion of the second dot formation area so as to make the upper end portion of the second dot formation area overlap with the lower end portion of the first dot formation area and fill spaces between the dots intermittently formed on the lower end portion of the first dot formation area, by controlling the image forming section;
   an acquiring section that acquires image data; and
   a cancellation section that cancel the overlap control when a blank area not having any dot in the whole range of a plurality of successive main scanning lines exists in an image represented by the image data and a nozzle forming at least one of the lower end portion of the first dot formation area and the upper end portion of the second dot formation area is positioned at a boundary portion between the blank area and an image forming area having the dots formed thereon.

2. The liquid ejecting apparatus according to claim 1, wherein the image forming section transports the recording medium in the sub-scanning direction, in accordance with a width of the blank area in the sub-scanning direction, after forming the first dot formation area, when the blank area exists.

3. The liquid ejecting apparatus according to claim 1, wherein the overlap control section performs the overlap control by forming the dots on the lower end portion of the first dot formation area during the first main scanning on the basis of a first arrangement pattern, which is a pattern for arranging the dots, representing intermittent dot arrangement in a region corresponding to the lower end portion of the first dot formation area, and by forming the dots on the upper end portion of the second dot formation area during the second main scanning on the basis of a second arrangement pattern, which is a pattern for arranging the dots, representing intermittent dot arrangement reverse to the intermittent dot arrangement represented by the first arrangement pattern.

4. The liquid ejecting apparatus according to claim 3, wherein the cancellation section performs intermittent dot formation in the overlap control by forming dots on the basis of a third arrangement pattern representing successive dot arrangement in a region corresponding to at least one end portion, which is positioned on the boundary portion between the blank area and the image forming area, of the lower end portion of the first dot formation area and the upper end portion of the second dot formation so as to successively form the dots on the at least one end portion.

5. The liquid ejecting apparatus according to claim 3, wherein the cancellation section cancels intermittent dot formation in the overlap control by forming dots without use of the first arrangement pattern when the lower end portion of the first dot formation area is positioned on the boundary portion between the blank area and the image forming area and by forming dots without use of the second arrangement pattern when the upper end portion of the second dot formation area is positioned on the boundary portion between the blank area and the image forming area.

6. The liquid ejecting apparatus according to claim 3, wherein the cancellation section cancels the overlap control by adjusting an ejecting port for forming the intermittent dots to the blank area.

7. A liquid ejecting method for a liquid ejecting apparatus including: a printing head that ejects liquid from a plurality of nozzles to form dots on a recording medium; a head driving section that performs a scanning of the printing head in a main scanning direction; a transporting section that transports the recording medium in a sub-scanning direction crossing the main scanning direction; an image forming section that forms an image on the recording medium by repeatedly transporting the recording medium, the liquid ejecting method comprising:

acquiring image data;

forming a first dot formation area by ejecting the liquid from the nozzles during a first main scanning;

forming a second dot formation area adjacent to the first dot formation area by ejecting the liquid from the nozzles during a second main scanning performed after the first main scanning;

performing overlap control for intermittently forming dots on a lower end portion of the first dot formation area and intermittently forming dots on an upper end portion of the second dot formation area so as to make the upper end portion of the second dot formation area overlap with the lower end portion of the first dot formation area and fill spaces between the dots intermittently formed on the lower end portion of the first dot formation area; and canceling the overlap control when a blank area not having any dot in the whole range of a plurality of successive main scanning lines exists and a nozzle forming at least one of the lower end portion of the first dot formation area and the upper end portion of the second dot formation area is positioned at a boundary portion between the blank area and an image forming area having the dots formed thereon, on the basis of the image data.

\* \* \* \* \*